United States Patent
Agardh et al.

(10) Patent No.: US 10,925,004 B2
(45) Date of Patent: Feb. 16, 2021

(54) SLOTTED TRANSMISSION FOR BATTERY RECOVERY

(71) Applicant: Sony Mobile Communications Inc., Tokyo (JP)

(72) Inventors: Kåre Agardh, Rydebäck (SE); Vanja Plicanic Samuelsson, Lund (SE); Rickard Ljung, Helsingborg (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/486,830

(22) PCT Filed: Feb. 23, 2017

(86) PCT No.: PCT/EP2017/054238
§ 371 (c)(1),
(2) Date: Aug. 19, 2019

(87) PCT Pub. No.: WO2018/153465
PCT Pub. Date: Aug. 30, 2018

(65) Prior Publication Data
US 2019/0373557 A1 Dec. 5, 2019

(51) Int. Cl.
*H04W 52/02* (2009.01)
(52) U.S. Cl.
CPC ... *H04W 52/0267* (2013.01); *H04W 52/0251* (2013.01)
(58) Field of Classification Search
CPC .................................................. H04W 52/02
USPC .................................................. 455/572–574
See application file for complete search history.

(56) References Cited

U.S. PATENT DOCUMENTS

| | | | | |
|---|---|---|---|---|
| 6,477,162 B1* | 11/2002 | Bayley | ............... | H04B 1/70752 370/342 |
| 6,643,272 B1 | 11/2003 | Moon et al. | | |
| 6,678,262 B1* | 1/2004 | Sydon | .................. | H04B 7/2656 370/337 |
| 8,116,246 B2* | 2/2012 | Min | .................... | H04W 52/343 370/311 |
| 10,149,345 B2 | 12/2018 | Ljung | | |
| 2002/0184208 A1* | 12/2002 | Kato | .................. | G06F 16/9535 |
| 2003/0152049 A1 | 8/2003 | Turner | | |
| 2007/0248031 A1 | 10/2007 | Kitahara | | |
| 2009/0190538 A1 | 7/2009 | Hasegawa | | |
| 2012/0170485 A1 | 7/2012 | Maeda et al. | | |
| 2013/0064151 A1* | 3/2013 | Mujtaba | ............... | H04B 7/0817 370/311 |
| 2013/0107780 A1 | 5/2013 | Choi | | |

(Continued)

FOREIGN PATENT DOCUMENTS

WO 2016033249 A1 3/2016

OTHER PUBLICATIONS

International Search Report and Written Opinion from corresponding International Patent Application No. PCT/EP2017/054238, dated Oct. 25, 2017, 14 pages.

(Continued)

*Primary Examiner* — Joel Ajayi
(74) *Attorney, Agent, or Firm* — Tucker Ellis LLP

(57) ABSTRACT

A control message is indicative of a timing parameter of a slotted transmission (500) comprising active slots (501) and inactive slots (502). At least one repetition (351) of data (401) is transmitted in an active slot on a wireless link.

18 Claims, 16 Drawing Sheets

(56) References Cited

U.S. PATENT DOCUMENTS

2013/0294311 A1 11/2013 Cai
2013/0336186 A1 12/2013 Damnjanovic

OTHER PUBLICATIONS

Sony: "Considerations in NB-PUSCH," 3GPP Draft; R1-161880, 3rd Generation Partnership Project (3GPP), Mar. 16, 2016, 4 pages.
ZTE Corporation: "Discussion on the Tx Gaps for frequency error correction and the effective battery capacity for NB-IOT," 3GPP Draft; R4-163297, 3rd Generation Partnership Project (3GPP), May 22, 2016, 6 pages.
Chinese Office Action received for corresponding application 201580078142.2 dated Dec. 2, 2019, 9 pages.

* cited by examiner

SLOTTED TRANSMISSION FOR BATTERY RECOVERY

TECHNICAL FIELD

Various embodiments of the invention generally relate to techniques of slotted transmission on a wireless link of a network. Various embodiments of the invention specifically relate to communicating at least one control message indicative of a timing parameter of the slotted transmission.

BACKGROUND

Mobile communication by means of cellular networks is an integral part of modern life. Examples of cellular networks include the Third Generation Partnership Project (3GPP) Long Term Evolution (LTE; sometimes also referred to as 4G) and 3GPP New Radio (NR; sometimes also referred to as 5G) technology. Here, multiple nodes are connected to form the network. The network may include a plurality of cells.

In various scenarios it is desired to increase the coverage of a wireless link of the network. A set of features where a comparably large coverage is achieved is referred to as Coverage Enhancement (CE). CE is envisioned to be applied for Machine Type Communication (MTC) and the Narrowband IoT (NB-IOT), sometimes also referred to as NB-LTE. For example, such techniques may be based on the 3GPP LTE technology to some extent and may reuse some of the LTE concepts.

A key feature of CE is to implement multiple transmission repetitions of encoded data. Here, each repetition may include the same redundancy version of the encoded data. The repetitions may be "blind", i.e., may not in response to a respective retransmission request that may be defined with respect to a Hybrid Acknowledgment Repeat Request protocol (HARQ protocol). Rather, repetitions according to CE may be preemptive. Examples are provided by the 3GPP Technical Report (TR) 45.820 version 13.0.0 (2015-08), section 6.2.1.3. By employing CE, a likelihood of successful transmission can be increased even in scenarios of poor conditions of communicating on a corresponding wireless link. Thereby, the coverage of networks can be significantly enhanced—even for no transmission powers as envisioned for the MTC and MB-IOT domain.

However, techniques of CE may face certain restrictions and drawbacks. In particular, some mobile devices connected to the network—e.g., Internet of Things devices—may be equipped with comparably small and simple batteries for powering an interface for transmitting on the wireless link. For example, coin-cell batteries may be used. Such batteries can have certain limitations in view of their performance. For example, the maximum current drain in time and/or instantaneous current can be limited. Such limited battery performance can, in particular, become an issue in connection with CE. Typically, multiple repetitions of CE require an extended time duration for transmission. This extended time duration can impose challenges on the battery performance.

SUMMARY

Therefore, a need exists for advanced techniques of transmitting data on a wireless link. In particular, a need exists for such techniques which overcome or mitigate at least some of the above-identified restrictions and drawbacks.

This need is met by the features of the independent claims. The features of the dependent claims define embodiments.

A method includes transmitting at least one control message. The at least one control message is transmitted to a network node of a network. The at least one control message is transmitted on a wireless link of the network. The at least one control message is indicative of a timing parameter of a slotted transmission. The slotted transmission includes a plurality of active slots and a plurality of inactive slots. The method further includes transmitting at least one repetition of data. The at least one repetition of data is transmitted in at least one active slot of the plurality of active slots and on the wireless link.

A computer program product includes program code to be executed by at least one processor. Executing the program code causes the at least one processor to perform a method. The method includes transmitting at least one control message. The at least one control message is transmitted to a network node of a network. The at least one control message is transmitted on a wireless link of the network. The at least one control message is indicative of a timing parameter of a slotted transmission. The slotted transmission includes a plurality of active slots and a plurality of inactive slots. The method further includes transmitting at least one repetition of data. The at least one repetition of data is transmitted in at least one active slot of the plurality of active slots and on the wireless link.

A computer program includes program code to be executed by at least one processor. Executing the program code causes the at least one processor to perform a method. The method includes transmitting at least one control message. The at least one control message is transmitted to a network node of a network. The at least one control message is transmitted on a wireless link of the network. The at least one control message is indicative of a timing parameter of a slotted transmission. The slotted transmission includes a plurality of active slots and a plurality of inactive slots. The method further includes transmitting at least one repetition of data. The at least one repetition of data is transmitted in at least one active slot of the plurality of active slots and on the wireless link.

A device includes control circuitry. The control circuitry is configured to transmit at least one control message. The at least one control message is transmitted to a network node of a network and on a wireless link of the network. The at least one control message is indicative of a timing parameter of a slotted transmission. The slotted transmission includes a plurality of active slots and a plurality of inactive slots. The device is further configured to transmit at least one repetition of data in at least one active slot of the plurality of active slots and on the wireless link.

A method includes receiving at least one control message. The at least one control message is received from a device. The at least one control message is received on a wireless link of a network. The at least one control message is indicative of a timing parameter of a slotted transmission of the device. The slotted transmission includes a plurality of active slots and a plurality of inactive slots. The method further includes allocating one or more resources on the wireless link for transmission of data by the device. Said allocating of the one or more resources is in accordance with the timing parameter. The method further includes transmitting a scheduling control message indicative of the one or more resources on the wireless link and to the device.

A computer program product includes program code. Executing the program code by at least one processor causes the at least one processor to perform a method. The method includes receiving at least one control message. The at least one control message is received from a device. The at least one control message is received on a wireless link of a network. The at least one control message is indicative of a timing parameter of a slotted transmission of the device. The slotted transmission includes a plurality of active slots and a plurality of inactive slots. The method further includes allocating one or more resources on the wireless link for transmission of data by the device. Said allocating of the one or more resources is in accordance with the timing parameter. The method further includes transmitting a scheduling control message indicative of the one or more resources on the wireless link and to the device.

A computer program includes program code to be executed by at least one processor. Executing the program code by the at least one processor causes the at least one processor to perform a method. The method includes receiving at least one control message. The at least one control message is received from a device. The at least one control message is received on a wireless link of a network. The at least one control message is indicative of a timing parameter of a slotted transmission of the device. The slotted transmission includes a plurality of active slots and a plurality of inactive slots. The method further includes allocating one or more resources on the wireless link for transmission of data by the device. Said allocating of the one or more resources is in accordance with the timing parameter. The method further includes transmitting a scheduling control message indicative of the one or more resources on the wireless link and to the device.

A network node includes control circuitry. The control circuitry is configured to receive, from a device and on a wireless link of the network, at least one control message. The at least one control message is indicative of a timing parameter of a slotted transmission of the device. The slotted transmission includes a plurality of active slots and a plurality of inactive slots. The control circuitry is configured to allocate one or more resources on the wireless link for transmission of data by the device. Said allocating of the one or more resources is in accordance with the timing parameter. The control circuitry is further configured to transmit a scheduling control message on the wireless link into the device. The scheduling control message is indicative of the one or more resources.

A method includes transmitting at least one repetition of data. Said transmitting is in an active slot of a plurality of active slots of a slotted transmission. The slotted transmission includes the plurality of active slots and a plurality of inactive slots. Said transmitting of the at least one repetition of the data is on a wireless link of a network. A duration of the inactive slots of the plurality of inactive slots is not shorter than 50 milliseconds, optionally not shorter than 200 milliseconds, further optionally not shorter than 500 milliseconds.

A method includes receiving, in an active slot of a plurality of active slots a slotted transmission and on a wireless link of a network, at least one repetition of data. The slotted transmission includes the plurality of active slots and a plurality of inactive slots. A duration of the inactive slots is not shorter than 50 milliseconds, optionally not shorter than 200 milliseconds, further optionally not shorter than 500 milliseconds.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
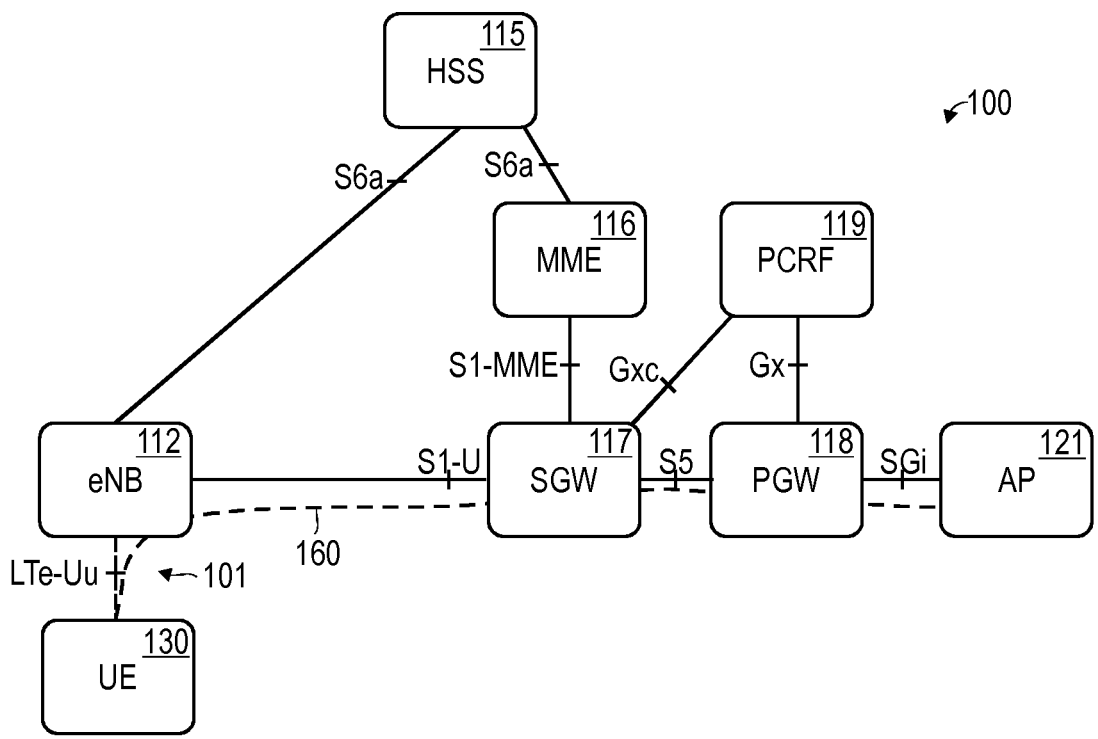
FIG. 1 schematically illustrates a network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of transmitting and/or receiving (communicating) encoded data on a wireless link of a network are disclosed. For example, the data may correspond to payload data of applications implemented by a node and/or a device. Alternatively or additionally, the data may correspond to control data, e.g., Layer 2 or Layer 3 control data according to the Open Systems Interface (OSI) model. According to various examples, the data may be uplink (UL) data or downlink (DL) data. For example, the data may be UL data transmitted from a mobile device (user equipment; UE) to a base station (BS). It would also be possible that the data is DL data transmitted from the BS to the UE. In other examples, UE-to-UE (D2D) communication on a sidelink of the wireless link of the network between two UEs could be employed.

According to various examples, a slotted transmission is employed for communicating the data. The slotted transmission includes a plurality of active slots and a plurality of inactive slots. Transmission of the data is performed in the active slots.

According to various examples, a slotted reception is employed for communicating the data. The slotted reception includes a plurality of active slots and a plurality of inactive slots. Reception of the data is performed in the active slots.

During the inactive slots, a battery for powering an interface for transmitting and/or receiving the data on the wireless link can recover/recuperate. In particular, such recovery of the battery may be due to a reduced power consumption of the interface during the inactive slots if compared to the active slots. The reduced power consumption may correspond to a limited current drain of the interface from the battery. Thereby, the battery can recover due to the limited current drain.

The duration of the inactive slots and/or the duration of the active slots of the slotted transmission and/or of the slotted reception may be configured in accordance with the battery performance. For example, the duration of the inactive slots may be configured sufficiently long to enable recovery of the battery. Typical durations of the inactive slots may not be shorter than 50 milliseconds, optionally not shorter than 200 milliseconds, further optionally not shorter than 500 milliseconds.

By facilitating recovery of the battery by means of the slotted transmission, the various examples disclosed herein facilitate reliable transmission of the data during the active slots: a likelihood of insufficient power supply by the battery for transmission of the data during the active slots is reduced. As an alternative or additional effect, wearout of the battery may be reduced by providing sufficient time for recovery.

Generally, the techniques disclosed herein may find application for any transmission of data on a wireless link of a network. A particular field of application of the techniques disclosed herein may relate to Internet of Things (IoT) UEs having a small and low-performance battery. Often, the communication of data may be implemented according to CE in such scenarios: here, the encoded data is redundantly communicated using a plurality of repetitions. Hence, the same encoded version of the data may be redundantly communicated a number of times according to various examples. Each repetition of the plurality of repetitions can include the data encoded according to the same redundancy version, e.g., redundancy version 0 or redundancy version 1, etc. Then, it is possible to combine the plurality of repetitions of the encoded data. Such combination may be implemented in an analog domain, e.g., in the baseband. The combination yields a combined signal. Then, the decoding of the encoded data can be based on the combined signal. Thus, by aggregating the received information across the multiple repetitions, the probability of successfully decoding of the encoded data increases. This facilitates CE. Such techniques of CE may find particular application in the framework of the IoT technology, e.g., according to 3GPP MTC or NB-IOT. Here, typically, the transmitting UE implements a comparably low transmit power. Due to the multiple repetitions of the encoded data, nonetheless, a sufficiently high likelihood of successfully receiving and decoding the encoded data is provided for.

In such a scenario it is in particular possible to spread out transmitting of multiple repetitions of the data encoded according to the same redundancy version across multiple subsequent active slots of the plurality of active slots of the slotted transmission. Thereby, it is possible to accommodate, both, a large number of repetitions of the data encoded according to the same redundancy version on the one hand-side, as well as limited performance of the battery in terms of contiguous active slots of the slotted transmission. Each active slot may include one or more repetitions of the data.

Various techniques disclosed herein are based on the finding that when using a small—e.g., coin-cell—battery in the mobile UE, the average and instantaneous current drain can be important not only for the possibility to get the required instantaneous energy from the battery, but also to prolong the battery lifetimes in terms of the number of possible charging cycles. In order to handle such UEs employing batteries of constraint performance, the time durations of high current drain pulses and the time durations in between high current drain pulses may be important for battery recovery aspects. This is achieved by the slotted transmission.

Furthermore, the UE may be equipped with one or more capacitors in order to handle high instantaneous energy feeds to perform transmission and/or reception on the wireless link. This may in particular be applicable if the maximum instantaneous current drain required for transmission and/or reception on the wireless link exceeds the battery performance per se. In such a scenario, the inactive slots between two active slots of the slotted transmission can facilitate recharging of the one or more capacitors.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a wireless link 101 between a UE 130 and the cellular network 100 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks.

A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 1. The various examples disclosed herein may be readily implemented for the 3GPP NB-IoT RAT, alternatively or additionally.

Other examples include other types of networks, e.g., Institute of Electrical and Electronics Engineers (IEEE) 802.11X Wireless Local Area Network, Bluetooth or Zigbee.

The 3GPP LTE RAT implements a HARQ protocol. The HARQ protects data communicated via the wireless link 101. FEC and retransmission are employed in this respect.

The UE 130 is connected via the wireless link 101 to a BS 112 of the cellular network 100. The BS 112 and the UE 130 implement the evolved UMTS terrestrial radio access technology (E-UTRAN); therefore, the BS 112 is labeled evolved node B (eNB) in FIG. 1.

For example, the UE 130 may be selected from the group including: a smartphone; a cellular phone; a tablet; a notebook; a computer; a smart TV; a MTC UE, an IoT UE; etc.

An MTC or IoT UE is typically a UE with a low to moderate requirement on data traffic volumes and loose latency requirements. Additionally, communication employing MTC or IoT UEs should achieve low complexity and low costs. Further, energy consumption of an MTC or an IoT UE should be comparably low in order to allow battery-powered UEs to function for a comparably long duration: The battery life should be sufficiently long. For example, a coin-cell battery may be employed. Generally, the battery may have limited performance, e.g., with respect to the current drain characteristics.

Communication on the wireless link 101 can be in UL and/or DL direction. Details of the wireless link 101 are illustrated in FIG. 2.

Figure 2:
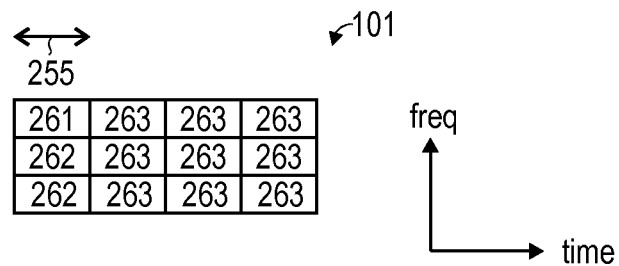
FIG. 2 schematically illustrates resources in a time-frequency resource grid according to various examples.

FIG. 2 illustrates aspects with respect to channels implemented on the wireless link 101. The wireless link 101 implements a plurality of communication channels 261-263. Transmission frames 255—e.g., implemented by sub-frames—of the channels 261-263 occupy a certain time duration. Each channel 261-263 includes a plurality of resources which are defined in time domain and frequency domain. For example, the resources may be defined with respect to symbols encoded and modulated according to Orthogonal Frequency Division Multiplexing (OFDM).

For example, a first channel 261 may carry synchronization signals which enable the BS 112 and the UE 130 to synchronize communication on the wireless link 101 in time domain.

A second channel 262 may be associated with control messages (control channel 262). The control messages may configure operation of the UE 130, the BS 112, and/or the wireless link 101. For example, radio resource control (RRC) messages and/or HARQ ACKs and NACKs can be exchanged via the control channel. According to the E-UTRAN RAT, the control channel 262 may thus correspond to a Physical DL Control Channel (PDCCH) and/or a Physical UL Control Channel (PUCCH) and/or a Physical Hybrid ARQ indicator Channel (PHICH).

Further, a third channel 263 is associated with a payload messages carrying higher-layer user-plane data packets associated with a given service implemented by the UE 130 and the BS 112 (payload channel 263). According to the E-UTRAN RAT, the payload channel 263 may be a Physical DL Shared Channel (PDSCH) or a Physical UL Shared Channel (PUSCH).

Turning again to FIG. 1, the BS 112 is connected with a gateway node implemented by a serving Gateway (SGW) 117. The SGW 117 may route and forward payload data and may act as a mobility anchor during handovers of the UE 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the UE 130 to seek access to the packet data network.

The PGW 118 can be an endpoint of an end-to-end connection 160 for packetized payload data of the UE 130. The end-to-end connection 160 may be used for communicating data of a particular service. Different services may use different end-to-end connections 160 or may share, at least partly, a certain end-to-end connection.

The end-to-end connection 160 may be implemented by one or more bearers which are used to communicate service-specific data. An EPS bearer which is characterized by a certain set of quality of service parameters indicated by the QoS class identifier (QCI).

Figure 3:
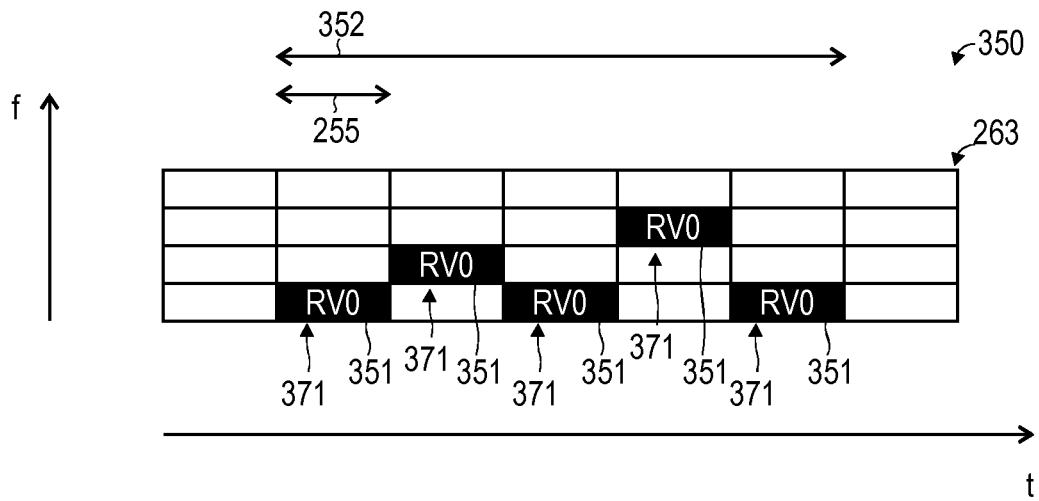
FIG. 3 schematically illustrates multiple repetitions of data encoded according to the same redundancy version according to various examples.

FIG. 3 illustrates aspects with respect to CE. In particular, FIG. 3 illustrates aspects with respect to a burst 350 including multiple repetitions 351 of data encoded according to a redundancy version 371. As can be seen from FIG. 3, the plurality of repetitions 351 are communicated in subsequent subframes 255 of the channel 263. The transmission burst 350 of the repetitions 351 has a certain duration 352. Typical durations 352 may be on the order of several tenths of milliseconds or even up to seconds.

While in the scenario of FIG. 3 the transmission burst 350 includes subsequent repetitions 350 of the encoded data in subsequent subframes 255, in other examples, it is also possible that subsequent repetitions are not arranged contiguously with respect to the subframes 255, i.e., there may be intermittent subframes not occupied by a repetition of the encoded data of the transmission burst (not shown in FIG. 3). According to some examples, such gaps may facilitate inactive slots of a slotted transmission. In other examples, it would be possible that subsequent repetitions 350 are arranged within a single subframe 255 (not shown in FIG. 3).

The specific time-frequency arrangement of the repetitions 351 is illustrated in the example of FIG. 3 is an example only. Other examples are possible.

While in the scenario of FIG. 3 encoded data is communicated on the payload channel 263, similar techniques may be readily applied to other kinds and type of data, e.g., control data.

Figure 4:
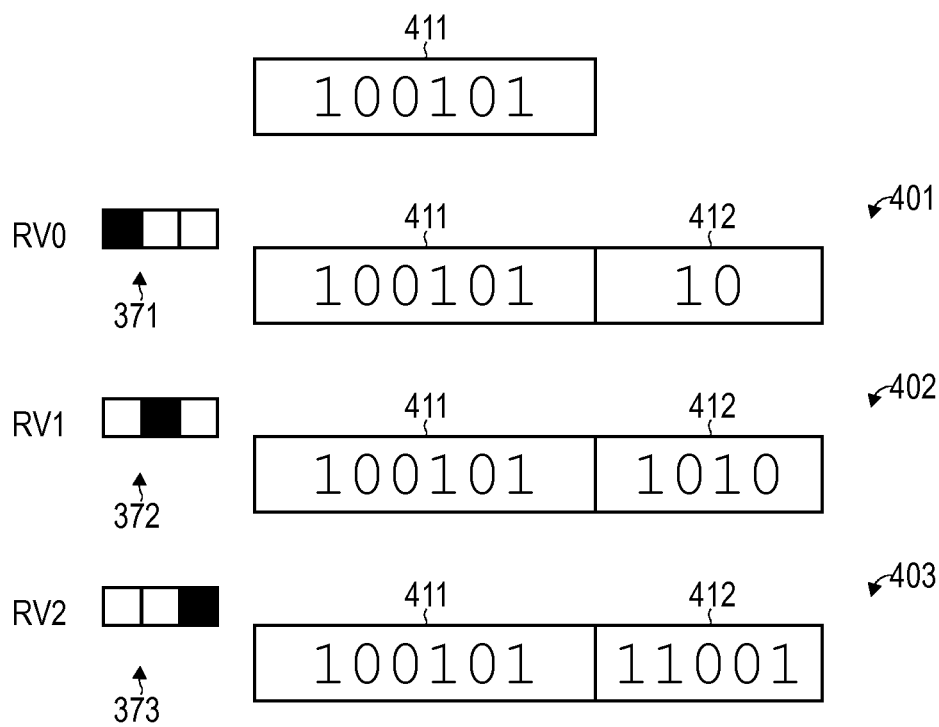
FIG. 4 schematically illustrates data encoded according to different redundancy versions according to various examples.

FIG. 4 illustrates aspects of encoding data 401-403 according to different redundancy versions 371-373. As can be seen from FIG. 4, the raw data 411 includes a sequence of bits. For example, the data 411 can be a data packet, e.g., a MAC layer Service Data Unit (SDU). It would also be possible that the data 411 corresponds to a RRC command or other control data such as a ACK, NACK, UL grant, or DL assignment.

Encoding the data 411 can correspond to adding a checksum 412 to the data 411 to yield the encoded data 401-403.

Different techniques of encoding can be employed such as, e.g., Reed Solomon encoding, turbo convolutional encoding, convolutional coding, etc. Provisioning the checksum 412 can facilitate reconstruction of corrupted bits of the corresponding message 401-403 according to the coding scheme. Typically, the longer (shorter) the checksum 412, the more (less) robust the communication of the corresponding message 401-403 against noise and channel imperfections; thus, a probability for successful transmission of the data 411 can be tailored by the length of the checksum. Alternatively or additionally, encoding the data can correspond to applying interleaving where the bits of the data 411 are shuffled (not shown in FIG. 4).

Typically, different redundancy versions 371-373 correspond to checksums 412 of different length (as illustrated in FIG. 4). In other examples, it would also be possible that different redundancy version 371-373 employ checksums 412 of the same length, but encoded according to the different coding scheme. Alternatively or additionally, different redundancy versions may employ different interleaving schemes. Alternatively or additionally, different redundancy versions may employ different puncturing schemes.

Hereinafter, an example implementation of constructing different redundancy versions is given.

STEP 1 of constructing different redundancy versions: A block of information bits, i.e., the raw data 411 to be transmitted, is encoded. Here, additional redundancy bits are generated, i.e., in addition to the data 411. Let N denote the number of information bits; then—e.g., for E-UTRA RAT—the total number of the encoded bits (i.e., the sum of information bits and redundancy bits) may amount to 3N. A decoder that receives all 3N bits typically is able to decode the information bits, even if a large number of bit errors is present in the received bits due to a high BER.

STEP 2 of constructing different redundancy versions: Thus, in order to avoid excessive overhead of transmission, only a fraction of the redundancy bits is selected. The information bits and the selected redundancy bits form the first redundancy version 371. The amount of encoded bits according to the first redundancy version is 371 therefore, using the above example, somewhere between N and 3N. The process of removing redundancy bits by selecting the fraction is sometimes referred to as puncturing. This first redundancy version 371 may then be sent to the receiver.

STEP 3 of constructing different redundancy versions: In case a retransmission is required according to the HARQ protocol, a new redundancy version 372, 373 is sent. The higher order redundancy version 372, 373 includes additional redundancy bits from the ones that were previously punctured in step 2, and typically the same information bits again. In this way, after a couple of repetitions the whole 3N bits have been sent at least once.

According to examples, each transmission burst 350 includes a plurality of repetitions 371 of the encoded data 401-403 being encoded according to the same redundancy version 371-373.

Figure 5:
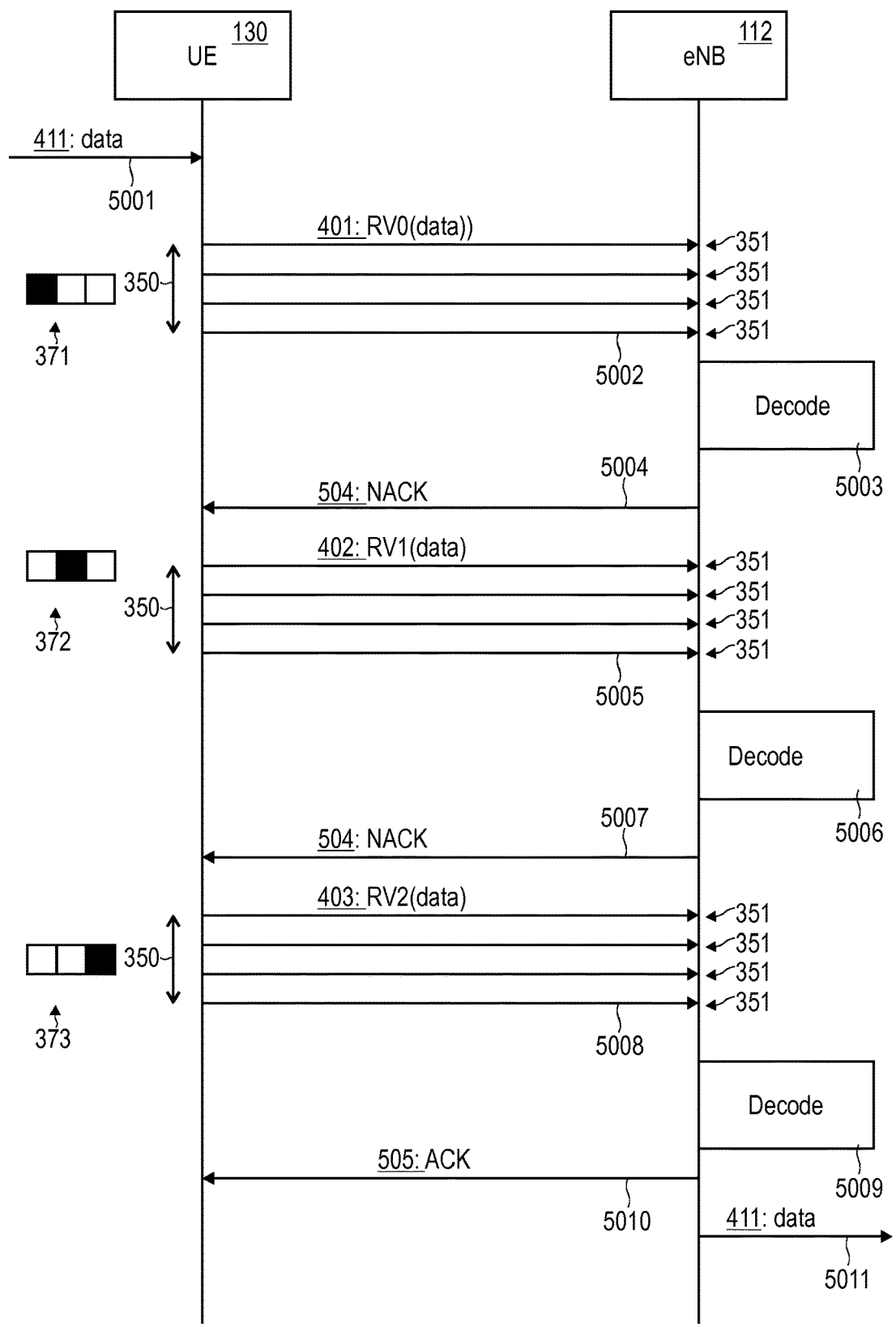
FIG. 5 is a signaling diagram illustrating CE communication of data encoded according to different redundancy versions according to various examples.

FIG. 5 illustrates aspects of the HARQ protocol implemented by the MAC layer (generally, Layer 2) of the transmission protocol stack of the UE 130 and the BS 112, respectively. The HARQ protocol according to the example of FIG. 5 employs transmission bursts 350 including multiple repetitions 351 of encoded data 401-403.

At 5001, the raw data 411 is received, e.g., from a higher layer at the transmit buffer implemented by the UE 130. The data 411 is encoded to yield the encoded data 401-403.

Then, signals 5002 including multiple repetitions 351 of the data 401 is transmitted by the UE 130 to the BS 112. This defines a transmission burst 350 according to CE. All repetitions 351 of the data 401 are encoded according to the redundancy version 371.

Once communication of the signals 5002 including the multiple repetitions 351 of the data 411 encoded according to the redundancy version 371 has ended, i.e., at the end of the transmission burst 350, the BS 112 attempts to decode the encoded data 401, 5003. Decoding at 5003 is based on a combination of the multiple repetitions 351 of the data 401 encoded according to the redundancy version 371. This helps to increase the probability of successfully decoding the data 411. In the example of FIG. 5, decoding fails at 5003 and, consequently, the BS 112 sends a negative acknowledgment message 504 to the UE 130 at 5004.

The UE 130 receives the negative acknowledgment message 504 and transmits signals 5005 including multiple repetitions 351 of the data 402 now encoded according to the redundancy version 372 in the respective transmission burst 350.

Then, at 5006, decoding—which is based on a combination of the multiple repetitions 351 of the signals 5005—again fails and the BS 112, at 5007, transmits another negative acknowledgment message 504.

The negative acknowledgment message 504 is received by the UE 130 which, in response to reception of the negative acknowledgment message 504, transmits signals 5008 including multiple repetitions 351 of the data 403 encoded according to the redundancy version 373.

Then, at 5009, decoding—which is based on the combination of the multiple repetitions 351 of the data 403 included in the signals 5008—is successful and, consequently, the BS 112 transmits a positive acknowledgment message 505 at 5010 to the UE 130. Then, the decoded data 411 can be passed to higher layers at 5011, e.g., from a receive buffer of the BS 112.

FIG. 5 is an example of communication of the data 411 in UL direction. Similar techniques may be readily applied for communication and DL direction.

Figure 6:
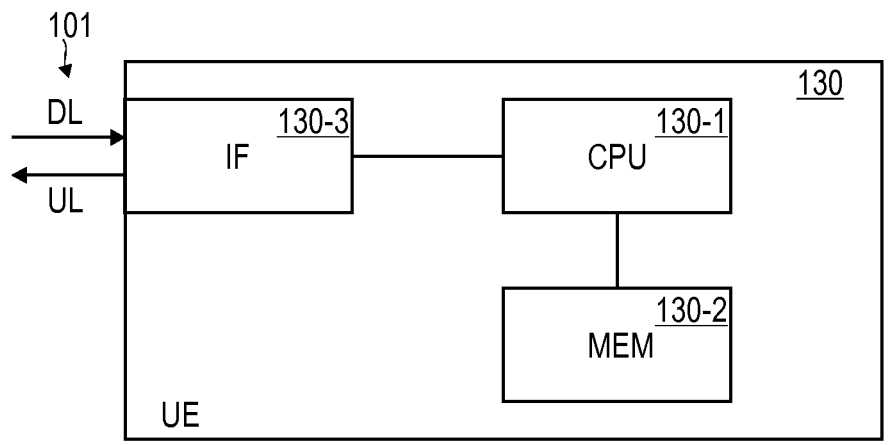
FIG. 6 schematically illustrates a device connectable to a network according to various examples.

FIG. 6 schematically illustrates the UE 130. The UE 130 includes control circuitry implemented by a processor 130-1, e.g., a single core or multicore processor. Distributed processing may be employed. The processor 130-1 is coupled to a memory 130-2, e.g., a non-volatile memory. The memory 130-2 may store program code that is executable by the processor 130-1. Executing the program code may cause the processor 130-1 to perform techniques as disclosed herein, e.g., relating to: CE; implementing a slotted transmission; determining a timing parameter of the slotted transmission; etc. Such functionality which is illustrated with respect to the processor 130-1 in the example of FIG. 6, in other examples may also be implemented using hardware. The UE 130 also includes an interface 130-3 configured to communicate with the BS 112 on the wireless link 101. The interface 130-3 may include an analog front end and/or a digital front end. The interface 130-3 may implement a transmission protocol stack, e.g., according to the 3GPP LTE technology. The transmission protocol stack may include a physical layer (Layer 1), a MAC layer (Layer 2), etc.

Figure 7:
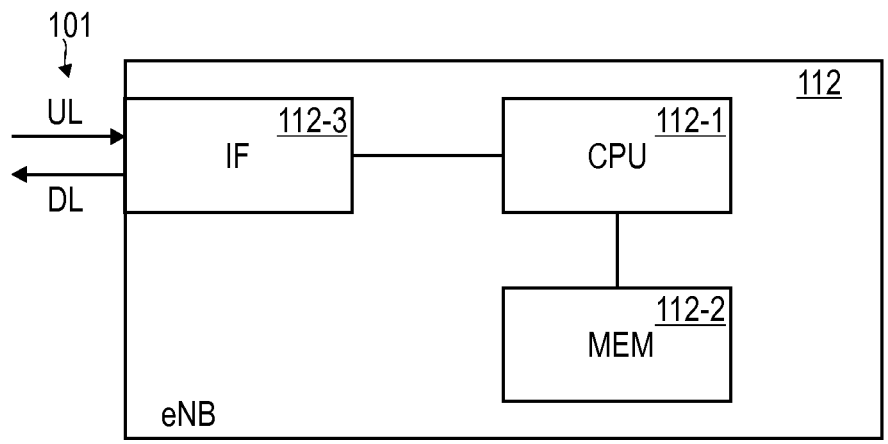
FIG. 7 schematically illustrates a base station of a network according to various examples.

FIG. 7 schematically illustrates the BS 112. The BS 112 includes control circuitry implemented by a processor 112-1, e.g., a single core or multicore processor. Distributed processing may be employed. The processor 112-1 is coupled to a memory 112-2, e.g., a non-volatile memory. The memory 112-2 may store program code that is executable by the processor 112-1. Executing the program code can cause the processor 112-1 to perform techniques as disclosed herein, e.g., relating to: CE; implementing a slotted transmission; allocating resources in accordance with a timing parameter of the slotted transmission; etc. Such techniques as illustrated with respect to FIG. 11 for the processor 112-1 and the memory 112-2 may also be implemented partly or fully in hardware in other examples. The BS 112 also includes an interface 112-3 configured to communicate with the UE 130 on the wireless link 101. The interface 112-3 may include an analog front end and/or a digital front end. The interface 112-3 may implement a transmission protocol stack, e.g., according to the 3GPP LTE technology. The transmission protocol stack may include a physical layer (Layer 1), a MAC layer (Layer 2), etc.

Figure 8:
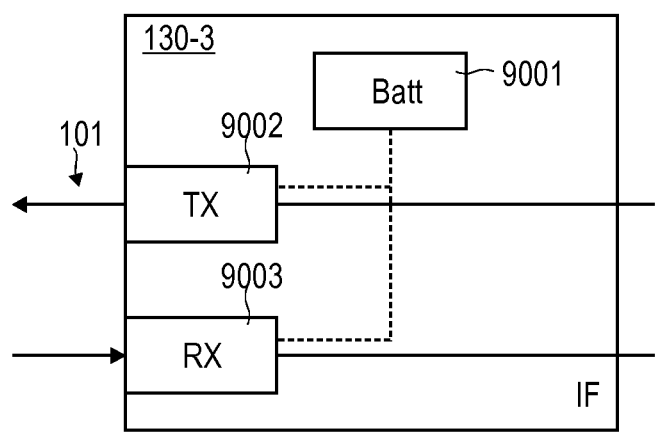
FIG. 8 schematically illustrates an interface for communicating on a wireless link of a network and employable for the device of FIG. 6 and/or the base station of FIG. 7 according to various examples.

FIG. 8 schematically illustrates the interface 130-3 in greater detail. In particular, the interface 130-3 includes a battery 9001 for powering transmission and reception via a transmit front end 9002 and receive front end 9003, respectively. For example, the battery 9001 may include a coin-cell battery cell and/or one or more capacitors. The battery 9001 may have limited performance.

Figure 9:
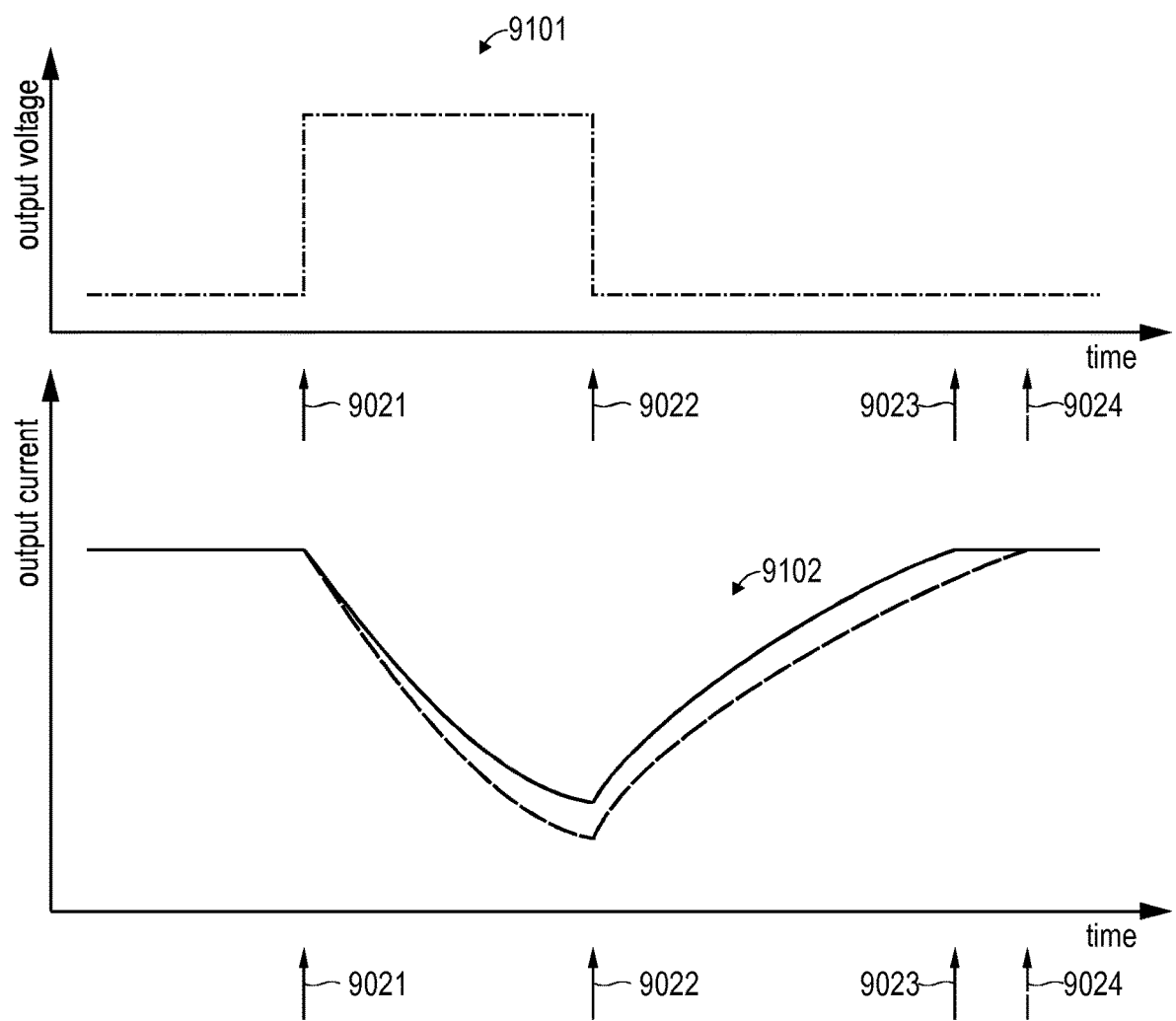
FIG. 9 schematically illustrates a current drain characteristic of a battery of the interface of FIG. 8 according to various examples.

FIG. 9 illustrates aspects with respect to the performance of the battery 9001. FIG. 9 schematically illustrates the output voltage provided by the battery 9001 over the course of time, as well as the output current provided by the battery 9001 over the course of time.

As illustrated in FIG. 9, during a transmit event 9101— i.e., when transmitting data 411 on the wireless link 101—a high level of the output voltage is provided by the battery 9001. This high level of the output voltage is maintained during the transmit event 9101, i.e., between the points in time 9021 and 9022.

From a comparison of the level of the output voltage during the transmit event 9101 and before or after the transmit event 9101, it is apparent that the power consumption of the interface 130-3, 112-3 is reduced before or after the transmit event 9101 if compared to during the transmit event.

FIG. 9 also illustrates the output current that can be provided by the battery 9001. As illustrated in FIG. 9, the output current reduces from a maximum level during the transmit event 9101 and takes a minimum value at the point in time 9022. For example, this reduction in the output current can be associated with the discharging of a corresponding capacitor. Then, between the points in time 9022, 9023 the achievable output current recovers during a recovery event 9102.

In FIG. 9, the output current characteristic is illustrated for two scenarios (full line and dash line). As illustrated in FIG. 9, different output current characteristics are conceivable. For example, a more severe current drain can result in an extended duration of the recovery event 9102 (dashed line, between points in time 9022 and 9024).

Generally, the battery performance—e.g., related to the output current characteristic—may be associated with various parameters. For example, the battery performance may be associated with a state of charge (SoC) and/or a state of health (SoH) of the battery 9001. For example, if the SoC of the battery 9001 is reduced and/or if the SoH of the battery 9001 is degraded, the duration of the recovery event 9102 may be prolonged.

On the other hand, the energy drain from the battery 9001 can be influenced by various properties of the mode of operation of the interface 130-3. For example, depending on at least one of a modulation scheme used for transmitting the data 411 and a transmit power used for transmitting the data 411, the output current drain by the interface 130-3, 112-3 may be smaller or larger. Then, the energy drain from the battery 9001 during the duration of the transmit event 9101 may be smaller or larger.

As will be appreciated from FIG. 9, depending on the battery performance, transmission and/or reception of data 411 can be negatively affected. For example, if the output current that can be provided by the battery 9001 falls below a certain threshold, operation of the interface 130-3 can be negatively affected. Furthermore, if the battery 9001 is not given enough time for recovery, the lifetime of the battery may be reduced due to increased wear out. In order to account for such effects, according to various examples disclosed herein, slotted transmission may be employed.

Figure 10:
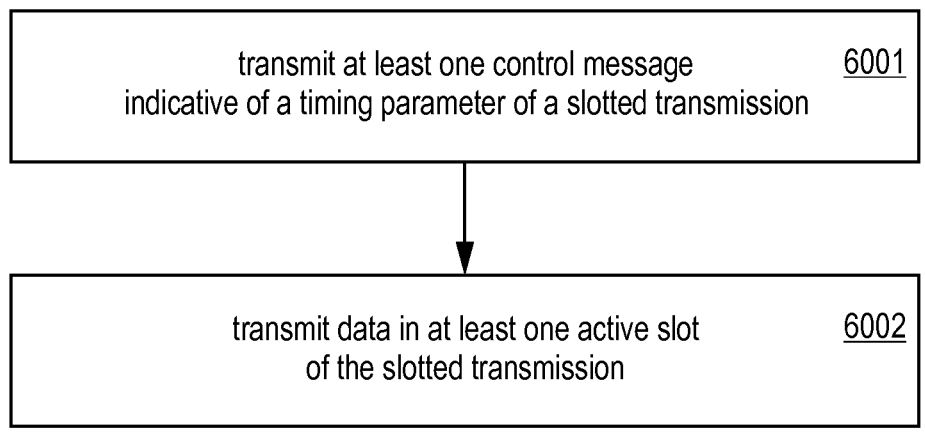
FIG. 10 is a flowchart of a method according to various examples.

FIG. 10 is a flowchart of a method according to various examples. In particular, the flowchart according to FIG. 10 illustrates aspects with respect to the slotted transmission. For example, the method according to the example of FIG. 10 could be executed by the UE 130.

First, at 6001, at least one control message is transmitted. The at least one control message is indicative of a timing parameter of the slotted transmission. For example, the control message may be indicative of a certain timing capability that may be implemented in view of the slotted transmission: here, the timing parameter may specify upper or lower bounds for the timing of the slotted transmission. In other examples, the timing parameter may directly specify a value to be used for the slotted transmission.

The timing of the slotted transmission may be constrained by the battery performance. In one example, the timing parameter can correspond to the capability of a minimum duration of the inactive slots of the slotted transmission. By providing the control message which is indicative of the capability in terms of the minimum duration of the inactive slots of the slotted transmission, a sufficient duration of the recovery events 9102 can be facilitated. This may increase the lifetime of the battery due to a reduced wear out. In another example the timing parameter can correspond to the capability of a maximum duration of the active slots of the slotted transmission. In another example the timing parameter can correspond to both a maximum duration of the active slots and the minimum duration of the inactive slots of the slotted transmission.

Next, at 6002, data is transmitted in at least one active slot of the slotted transmission. By transmitting the data in accordance with the slotted transmission, the energy drain from the battery powering the interface for transmitting the data can be optimized in view of the battery performance. In an example, said transmitting the data in accordance with the slotted transmission could be determined as using a duration of the inactive slot corresponding to same or longer value than the control message indication. In another example, said transmitting the data in accordance with the slotted transmission could be determined as using a duration of the active slot of the slotted transmission equal or shorter than the control message indication. In another example, said transmitting the data in accordance with the slotted transmission can be a combination of both using a duration of the inactive slot longer or equal than the control message indication and using a duration of the active slot equal or shorter than the control message indication.

Figure 11:
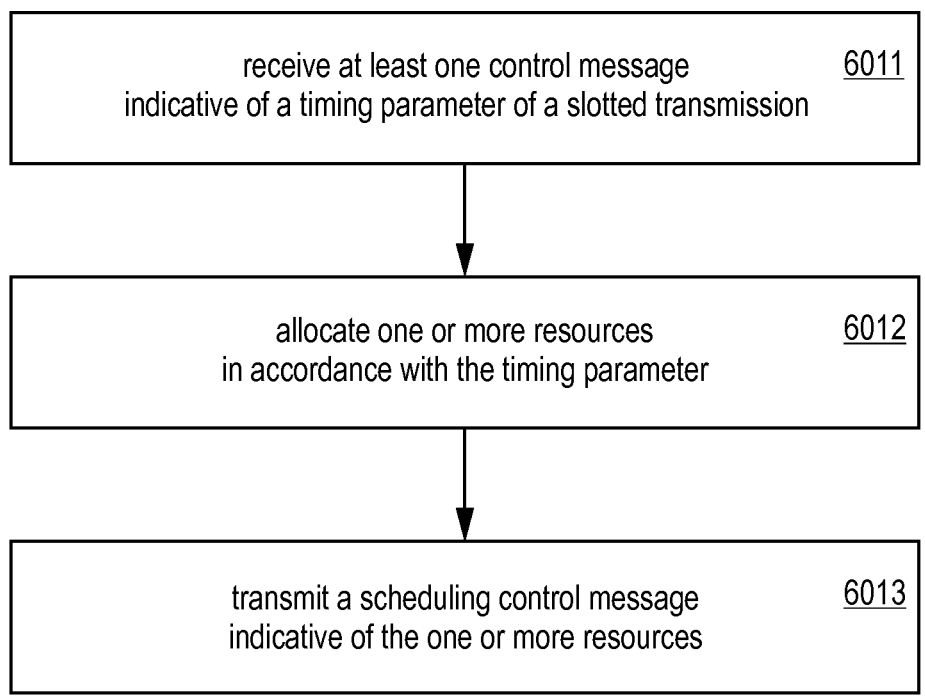
FIG. 11 is a flowchart of a method according to various examples.

FIG. 11 is a flowchart of a method according to various examples. In particular, FIG. 11 illustrates aspects with respect to the slotted transmission. For example, the method according to FIG. 11 could be executed by the BS 112.

At 6011, at least one control message which is indicative of a timing parameter of the slotted transmission is received. For example, 6011 can be inter-related to 6001.

Then, in 6012, resources are allocated on the wireless link in accordance with the timing parameter. In other words, it is possible that in 6012 resources are allocated which are situated within the active slots of the slotted transmission. In particular, the resources can be allocated such that the capabilities associated with the timing parameter of the slotted transmission as received in 6011 are not exceeded. Allocation of the resources may effectively fix a certain timing of the slotted transmission, i.e., a duration of the active slots and a duration of the inactive slots.

Next, in 6013, a scheduling control message is transmitted. The scheduling control message is indicative of the resources allocated in 6012. The scheduling control message facilitates transmission of data in accordance with the timing parameter.

For example, the resources could be allocated on an UL channel for transmitting data from a UE to a BS of the network. Alternatively or additionally, the resources could be allocated on a sidelink channel for transmitting data from a first UE to a second UE according to UE-to-UE communication. For example, the resources could be allocated on an UL channel for transmitting data from a UE to a BS of the network via a relay node.

Figure 12:
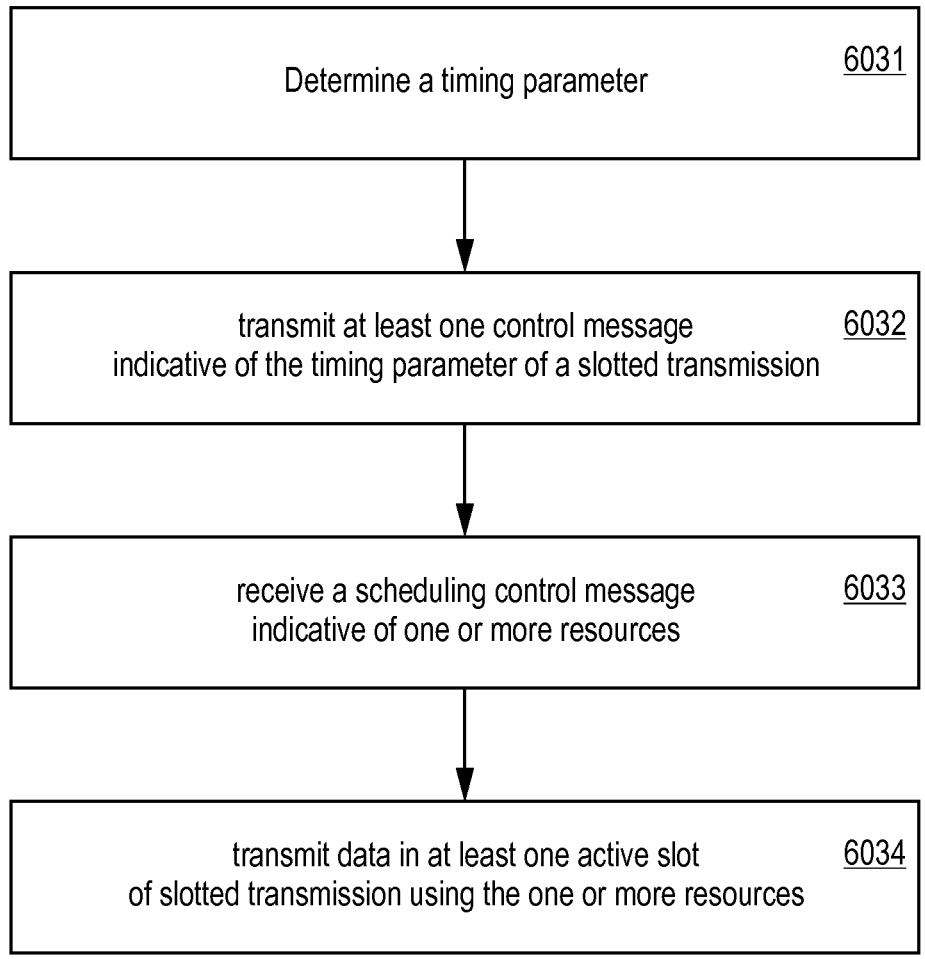
FIG. 12 is a flowchart of a method according to various examples.

FIG. 12 is a flowchart of a method according to various examples. In particular, FIG. 12 illustrates aspects with respect to slotted transmission.

First, at 6031, a timing parameter of the slotted transmission is determined. For example, the timing parameter may correspond to a capability in terms of the minimum duration of the inactive slots of the slotted transmission. In other words, the timing parameter may specify the duration of the inactive slots which should not be undercut by the slotted transmission, e.g., in view of the battery performance.

Alternatively or additionally, the timing parameter may correspond to at least one of the following: a maximum duty cycle of a duration of the active slots with respect to a duration of the inactive slots; and a maximum duration of the active slots of the slotted transmission.

For example, the maximum duty cycle may facilitate reliable powering of the interface, e.g., in view of battery performance. For example, the maximum duration of the active slots can specify the maximum duration of the active slots which should not be exceeded by the slotted transmission in order to enable reliable transmission, e.g., in view of the battery performance.

The capability in terms of the timing of the slotted transmission may depend on various properties of the transmission of the data. For example, the capability may depend on a modulation scheme used for transmitting of the data. For example, the modulation scheme may be associated with a constellation of symbols encoding the data. Alternatively or additionally, the timing parameter may depend on a transmit power used for transmitting the data. For example, the energy drain of the interface may depend on the modulation scheme and/or the transmit power. Then, also the timing parameter of the control message may be dependent on the modulation scheme and/or the transmit power. In one example, it would be possible that the timing parameter is implicitly indicated by the control message by specifying the modulation scheme used for transmitting the data and/or the transmit power used for transmitting the data. Then, by knowledge of the above-referenced dependency between the timing parameter and the modulation scheme and/or the transmit power, it is possible to conclude back on the timing parameter. In other examples, it would also be possible to take into account the modulation scheme and/or the transmit power when determining the timing parameter in 6031.

Beyond such properties of the transmission such as the modulation scheme and/or the transmit power, it would also be possible to take into account further properties in 6031. For example, it would be possible to monitor at least one of the SoC and the SoH of the battery. Then, the timing parameter can be determined on said monitoring of the at least one of the SoC and the SoH. Such a scenario may be based on the finding that the recovery of the battery may depend on the SoC and/or the SoH.

Alternatively or additionally, it is possible that the energy drain from the battery during a transmit event depends on the SoC and/or the SoH. Consistently, according to various examples, it would be possible to determine the timing parameter based on monitoring the energy drain from the battery during the active slots. Alternatively or additionally, it would also be possible to monitor the recovery of the battery during the inactive slots and determine the timing parameter based on said monitoring of the recovery of the battery.

Then, in 6032, the at least one control message is transmitted which is indicative of the timing parameter of the slotted transmission. 6032 may hence correspond to 6001.

In 6033, a scheduling control message is received which is indicative of one or more resources. The one or more resources are included in the active slots of the slotted transmission. 6033 may be inter-related with 6013.

Then, in 6034, the data is transmitted in at least one active slot of the slotted transmission and using the one or more resources as indicated by the scheduling control message.

Figure 13:
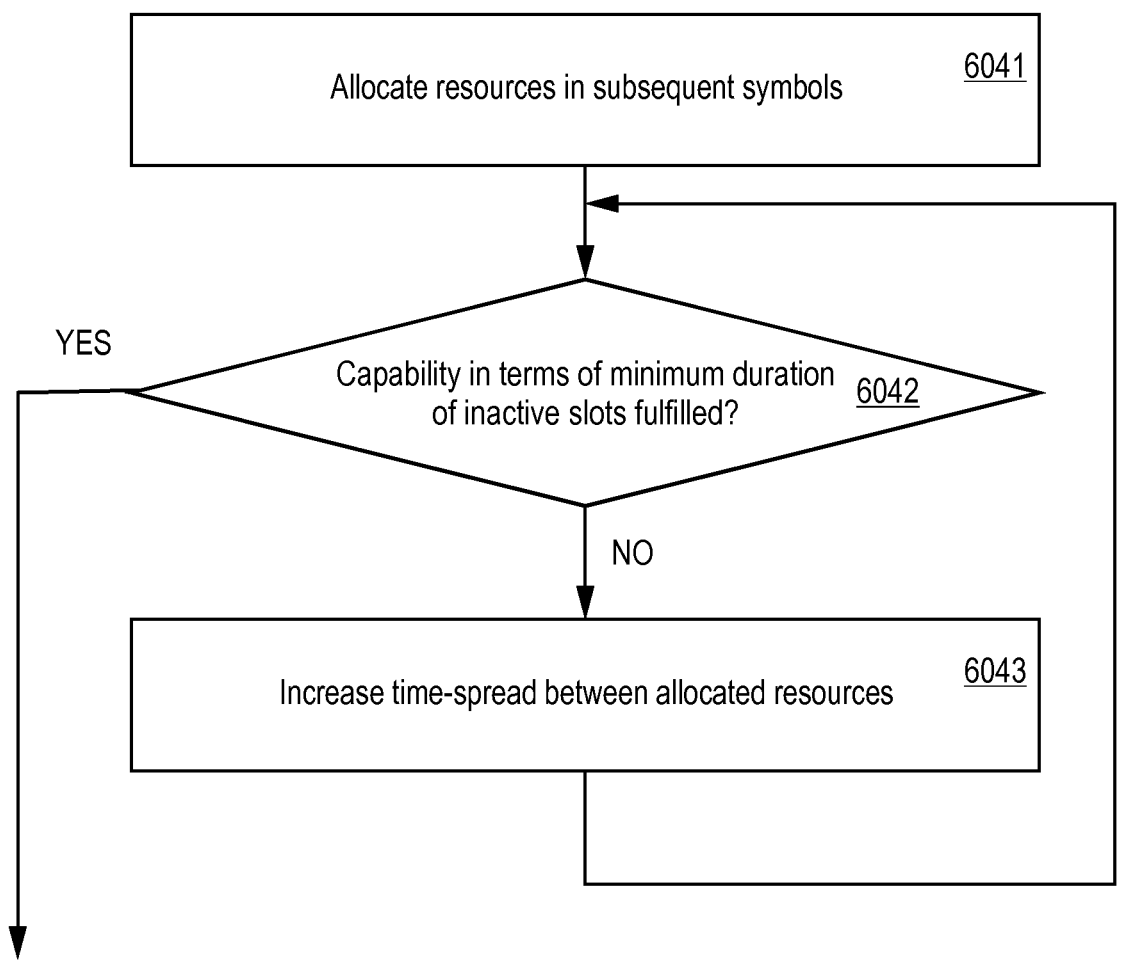
FIG. 13 is a flowchart of a method according to various examples.

FIG. 13 is a flowchart of a method according to various examples. FIG. 13 illustrates aspects with respect to allocating one or more resources in accordance with timing parameter indicated in a control message. For example, the method according to FIG. 13 could be executed by the BS 112.

First, in 6041, resources are allocated in subsequent symbols. Symbols may be defined with respect to a time-frequency resource grid and may correspond to the minimum increment in time provided for by the time-frequency resource grid.

Next, in 6042, it is checked whether a capability of a slotted transmission in terms of a minimum duration of the inactive slots of the slotted transmission of the UE for which the resources are allocated is violated. For example, said capability may correspond to the timing parameter indicated by a control message previously received from the UE.

If the capability is violated, then, in 6043, the time-spread between subsequent allocated resources is increased. For example, this may correspond to not allocating resources in some subsequent symbols in the time-frequency resource grid. An inactive slot of the slotted transmission is thereby defined.

Then, 6042 is re-executed.

If, in 6042, it is judged that the capability of the minimum duration of the inactive slots of the slotted transmission is not violated, the currently allocated resources can be used and, e.g., may be indicated to the UE using a scheduling control message.

Figure 14:
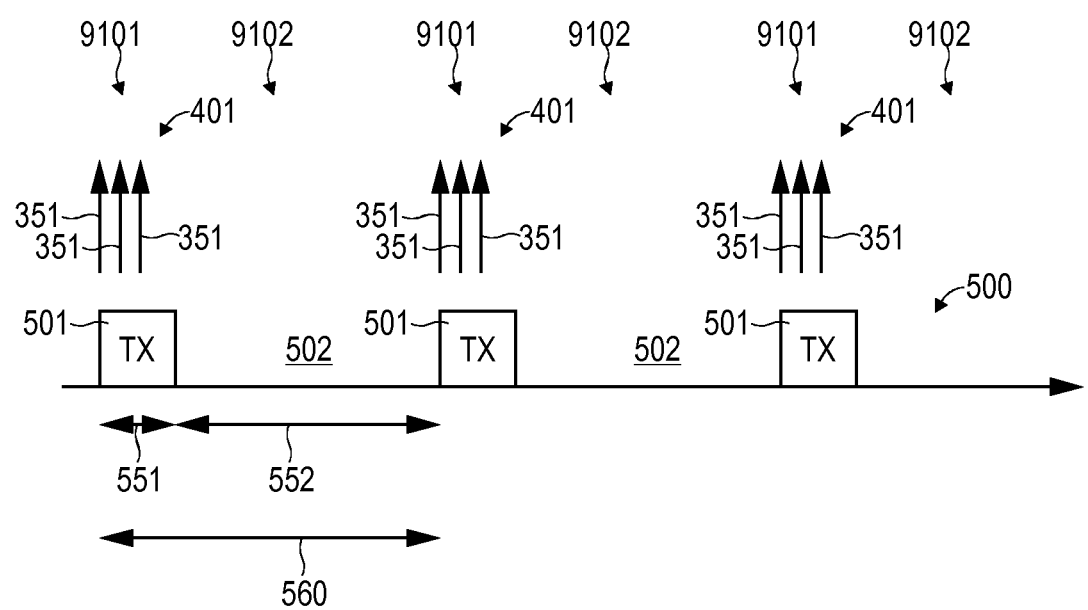
FIG. 14 illustrates a slotted transmission including a plurality of active slots and a plurality of inactive slots according to various examples.

FIG. 14 illustrates aspects with respect to the slotted transmission 500. The slotted transmission 500 includes active slots 501 and inactive slots 502. In FIG. 14, a duration 551 of the active slots 501 is illustrated. Furthermore, in FIG. 14, a duration 552 of the inactive slots 502 is illustrated. Furthermore, a periodicity 560 of the slotted transmission 500 is illustrated; while in FIG. 14, a strict periodicity between consecutive active slots 501 is illustrated, in other examples, it is not required to implement a strict periodicity between consecutive active slots 501.

For example, it would be possible that the duration of the inactive slots 502 is not shorter than 50 milliseconds, optionally not shorter than 200 milliseconds, further optionally not shorter than 500 milliseconds. It has been observed that such dimensioning of the minimum duration of the inactive slots 502 facilitates recovery of typical batteries, e.g., coin-cell batteries.

During the active slots 501, multiple repetitions 351 of encoded data 401 are transmitted. Encoded data 401 is not transmitted during the inactive slots 502, thereby giving the battery 9001 time to recover. In the example of FIG. 14, multiple repetitions of the data 401 encoded according to the same redundancy version 371 are transmitted in multiple subsequent active slots 501 of the slotted transmission 500. Thereby, CE is facilitated by obeying certain limitations imposed by the battery performance.

As will be appreciated from a comparison of FIG. 14 with FIG. 9, transmit events 9101 are implemented during the active slots 501 and recovery events 9102 are implemented during the inactive slots 502. Thereby, it is possible to reduce the power consumption of the interface 130-3, 112-3 for transmitting the data 401 on the wireless link 101 in the inactive slots 502 if compared to the active slots 501. This facilitates recovery of the battery 9001.

Figure 15:
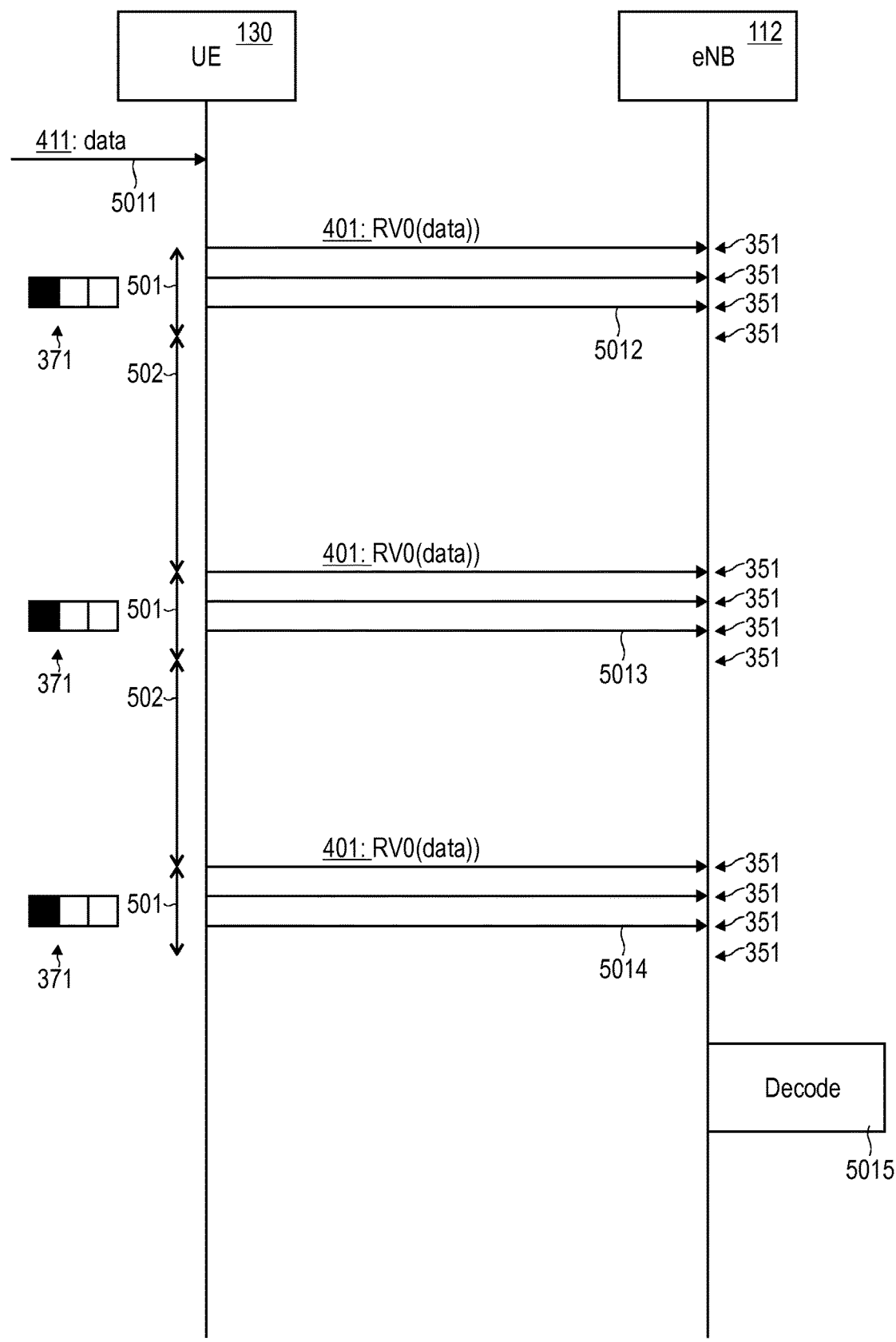
FIG. 15 is a signaling diagram illustrating transmission of data in active slots of the slotted transmission according to various examples.

FIG. 15 is a signaling diagram illustrating communication between the UE 130 and the BS 112 according to the slotted transmission 500. In particular, FIG. 15 illustrates the signaling flow for the example of FIG. 14.

At 5011, the unencoded data 411 arrives in a transmit buffer of the UE 130. Then, in signals 5012, the encoded data 401 is transmitted during the active slot 501. The data 401 is encoded according to the redundancy version 371.

Then, an inactive time 502 is implemented. In signals 5013, again, the data 401 encoded according to the redundancy version 371 is transmitted.

Next, again, an inactive slot 502 is implemented. In signals 5014, multiple repetitions 351 of the data 401 encoded according to the redundancy version 371 are transmitted during the active slot 501.

Finally, at 5015, decoding is implemented by the BS 112. The decoding at 5015 is based on a combination of the received signals 5012, 5013, 5014 of all repetitions 351 across the multiple active slots 501 at 5012, 5013, and 5014.

Figure 16:
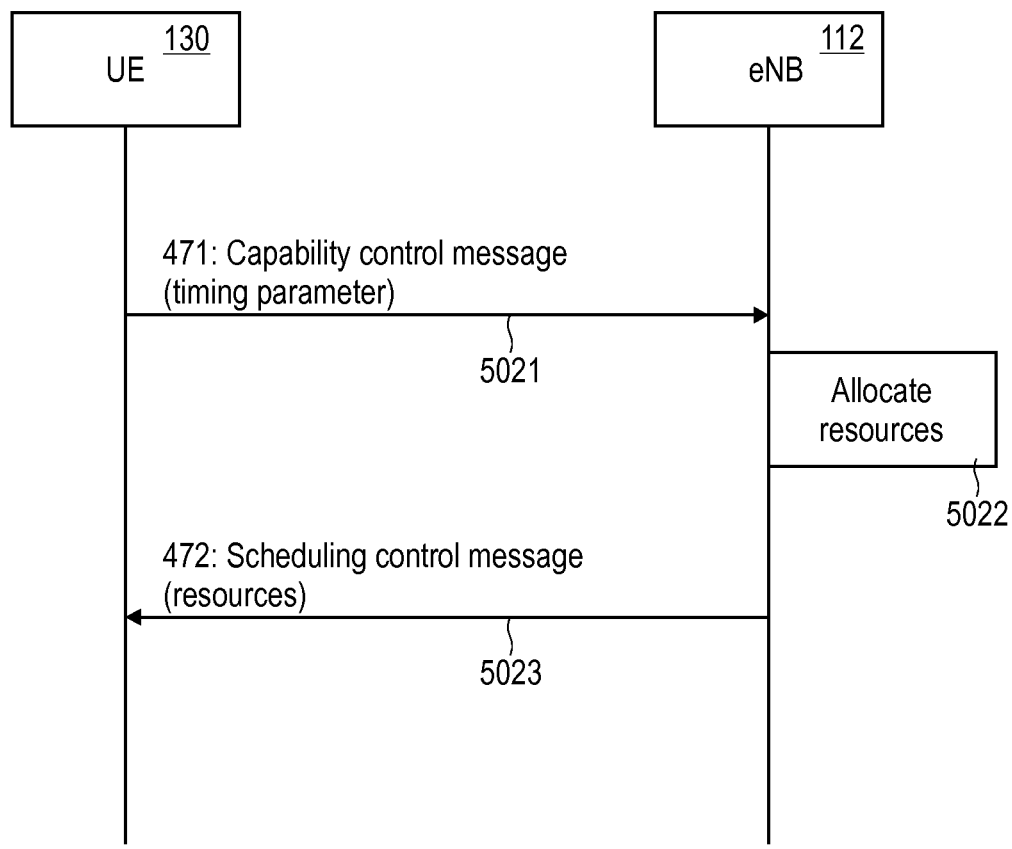
FIG. 16 is a signaling diagram schematically illustrating scheduling transmission of data in resources included in the active slots of the slotted transmission according to various examples.

FIG. 16 is a signaling diagram of communication between the UE 130 and the BS 112.

At 5021, the control message 471 is transmitted by the UE 130 and received by the BS 112. The control message is indicative of a timing parameter. The timing parameter may correspond to a certain capability in terms of the timing of the slotted transmission 500.

Then, the BS 112 allocates one or more resources in accordance with the timing parameter, 5022.

In particular, the allocation of the resources at 5022 can be performed such that certain constraints imposed by the timing parameter as indicated by the control message are met.

The allocated one or more resources are then signaled to the UE 130 by means of the scheduling control message 472. In particular, at 5023, the BS 112 transmits the scheduling control message 472 and the UE 130 receives the scheduling control message 472.

It would then be possible that the UE 130 transmits encoded data in accordance with the one or more resources as indicated by the scheduling control message 472. As such, the resources may define the timing of the slotted transmission, i.e., the active slots and inactive slots. For example, the resources may reside on an UL control channel or UL data channel from the UE 130 to the BS 112. In other examples, the UE 130 may transmit the encoded data using the resources residing on a sidelink channel.

As explained above, the control message may be indicative of the timing parameter in various manners. For example, the timing parameter may correspond to a capability in terms of a minimum duration of the inactive slots. Alternatively or additionally, the timing parameter may correspond to a capability in terms of the maximum duration of the active slots of the slotted transmission. In other words, it would be possible that the control message is indicative of a maximum transmit pulse duration which may depend on, e.g., the transmit power and/or the modulation scheme. Typically, the modulation scheme can impact the peak to average power ratio (PAPR) which, in turn, will impact the available transmit output power. Then, typically, different modulation schemes result in different capabilities of the maximum duration of the active slots.

Generally, the timing parameter may be transmitted using explicit information, e.g., specifying the capability of the minimum duration and/or the capability of the maximum duration in absolute terms such as milliseconds. Other examples may rely on implicit indication of the timing parameter by the control message, e.g., in terms of pre-negotiated timing parameter categories, etc.

Generally, the transmission of the control message 471 may be reiterated from time to time. For example, this may be based on the finding that the BS 112 may utilize power control. Then, the UE 130 may be using different transmit powers over the course of time. Depending on the particular transmit power employed by the UE 130, a new control message being indicative of an updated timing parameter could be transmitted by the UE 130 to the BS 112. Alternatively or additionally, it would be possible to transmit the single control message 471 being indicative of the timing parameter which may specify the respective capability with respect to the slotted transmission in a parameterized manner, i.e., depending on at least one of the modulation scheme and the transmit power. Then, if the BS 112 changes the transmit power, based on such dependency indicated by the initial control message 471, a translation/mapping of the corresponding timing capability of the slotted transmission to the new transmit power could be made by the BS 112. This reduced control signaling overhead and reduces latency.

Generally, the scheduling could be implemented in various manners. For example, it would be possible to transmit a dedicated scheduling control message 472 per active slot 501. Then, to fulfill the total number of repetitions according to the CE, multiple scheduling control messages 472 are required to be communicated for the various active slots 501. In another example, it would be possible that a single scheduling grant 472 indicates all resources required for completing the repetitions 351 of the CE. To reduce the size of such a scheduling control message, it would be possible that the UE 130 assumes that the previously indicated timing parameter of the control message 471 is accepted by the BS 112. Then, the slotted transmission 500 can be implemented in accordance with this timing parameter. In other examples, it would also be possible to explicitly indicate the resources of the multiple active slots 501. This could be done by indicating the duration 552 of the inactive slots 502. This duration 552 may deviate or not deviate from the minimum duration that may have been indicated by the control message 471. For example, the duration 552 may be longer than the minimum duration. Alternatively or additionally, it would also be possible that the scheduling control message 472 is indicative of the duration 551 of the active slots 501 of the slotted transmission 500.

Above, various examples have been described with respect to slotted transmission of the UE 130 transmitting the encoded data 401. However, these examples and other examples, may be extended to cover concepts of slotted reception of the UE receiving encoded data.

Figure 17:
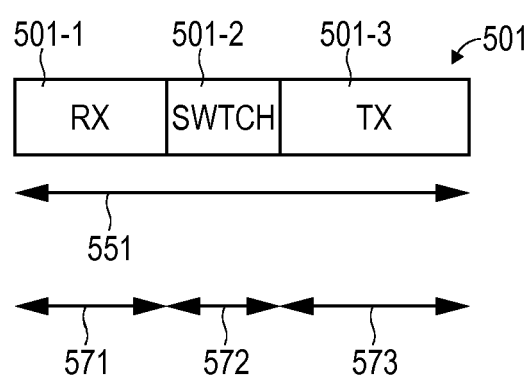
FIG. 17 illustrates an active slot of the slotted transmission including a receive section and a transmit section according to various examples.

FIG. 17 schematically illustrates aspects with respect to slotted transmission and slotted reception. In the example of FIG. 17, the active slot 501 includes a transmit section 501-3 and a receive section 501-1. Furthermore, the active slot 501 also includes a measurement gap 501-2.

For example, during the measurement gap 501-2, the UE 130 can cause transmission or reception to switch from transmission to reception or from reception to transmission, respectively. Pilot measurements can be performed in order to maintain time synchronization. Typically, the duration of the measurement gap 501-2 can be significantly smaller than the duration 552 of the inactive slots 502. For example, the duration 572 may be less than 10% of the duration 552, optionally less than 1%, further optionally less than 0.1%.

While the UE 130 transmits the encoded UL data 411 during the transmit section 501-3 of the active slot 501, it receives encoded DL data during the receive section 501-1 of the active slot 501. Again, CE may be used for communicating the DL data; again, multiple repetitions of the DL data encoded according to the same redundancy version may be distributed across multiple active slots 501 (not shown in FIG. 17).

In the example of FIG. 17, transmission of data and reception of data is implemented by the active slots 501 of the slotted transmission 500. In other examples, it would also be possible to implement separate active slots by using separated slotted transmission and slotted reception.

Figure 18:
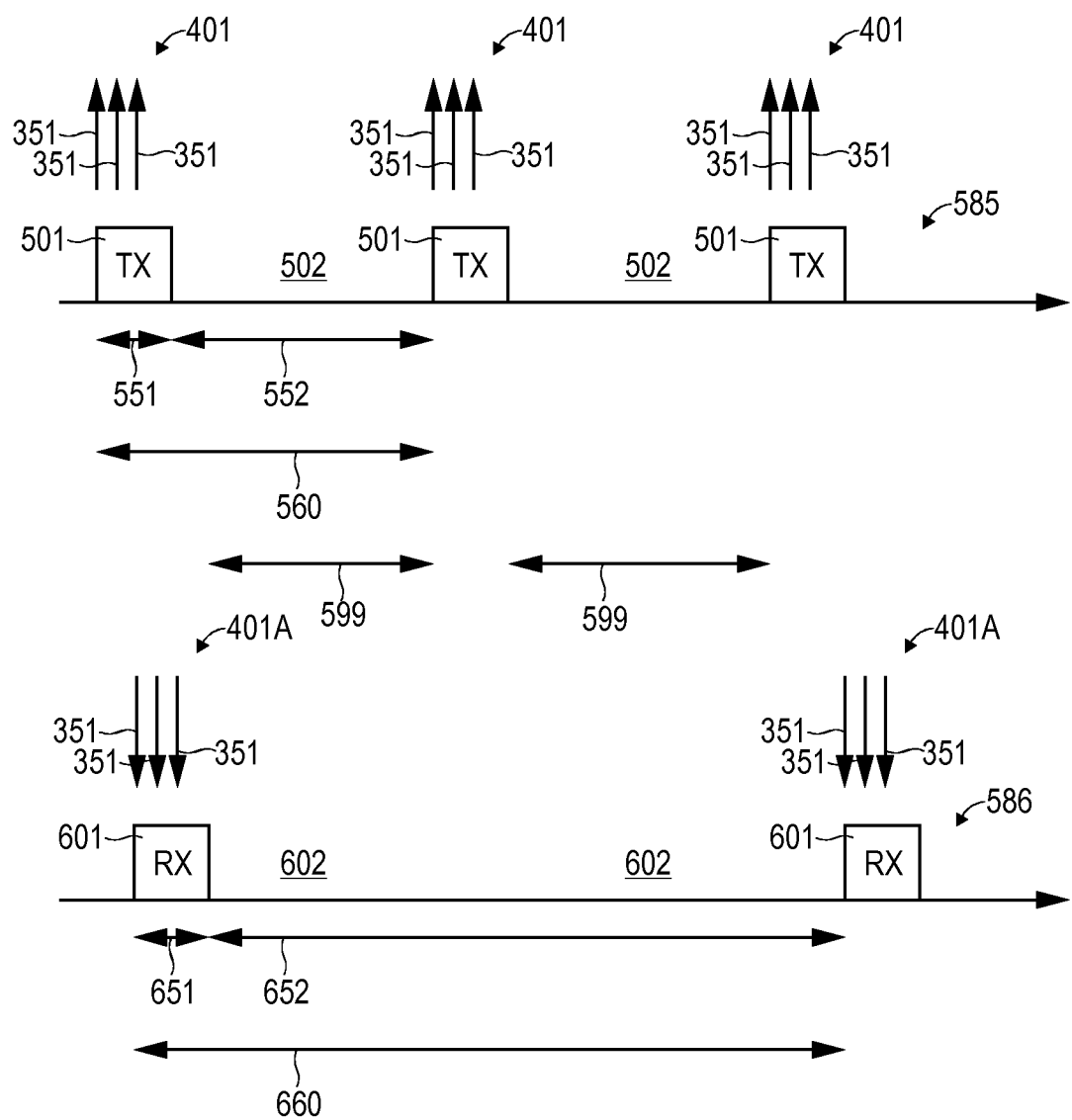
FIG. 18 schematically illustrates a time alignment of the slotted transmission and a slotted reception according to various examples.

FIG. 18 illustrates aspects with respect to a slotted transmission 585 and a slotted reception 586. The slotted transmission 585 and the slotted reception 586 implement separated active slots 501, 601 and inactive slots 502, 602. While multiple repetitions 351 of encoded data 401 are transmitted in the active slots 501 of the slotted transmission 585, multiple repetitions 351 of encoded data 401A are received in the active slots 601 of the slotted reception 586.

As illustrated in the example of FIG. 18, the inactive slots 501 and the inactive slots 601 are partially overlapping in time domain. This creates time durations 599 during which neither transmission events 9101, nor reception events take place. These time durations 599 facilitate recovery of the battery 9001.

Figure 19:
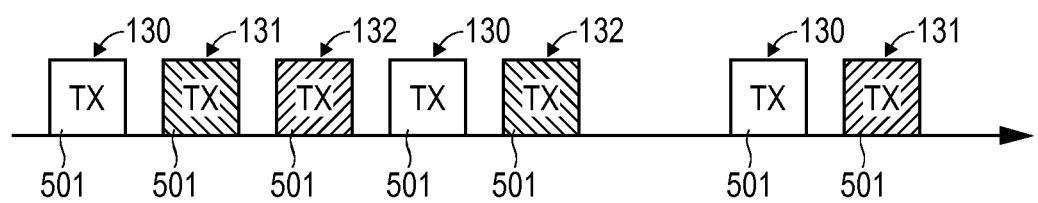
FIG. 19 schematically illustrates active slots of multiple slotted transmissions of multiple devices connectable to a network according to various examples.

FIG. 19 illustrates aspects with respect to allocating resources for multiple UEs 130-132. The example of FIG. 19 is based on the finding that the inactive slots 502 of the slotted transmissions 500, 585 of a given UE 130-132 may be used for scheduling other UEs 130-132. In particular, as illustrated in FIG. 19, the active slots 501 of the slotted transmissions 500, 585 of the various UEs 130-132 are interleaved in time domain. Alternatively or additionally, interleaving would also be possible in frequency domain. Such techniques facilitate efficient usage of the spectrum. The BS 112 may be configured to allocate the resources correspondingly. For this, timing parameters of the slotted transmissions 500, 585 may be received in respective control messages 471 received from the various UEs 130-132.

Then, respective scheduling control messages 472 may be transmitted by the BS 112 to the various UEs 130-132.

Summarizing, above techniques have been described which enable a UE to include gaps/inactive slots for battery recovery in its transmission and/or reception. This need may be due to a maximum pulse energy drain that can be supported by the battery. Based on such need to include recovery durations, slotted transmission and optionally slotted reception can be implemented.

According to various examples, a control message indicative of a timing parameter of the slotted transmission and optionally of the slotted reception is transmitted by the UE to the network. The timing parameter may indicate a capability of the UE in terms of the timing of the slotted transmission. For example, the timing parameter may correspond to the minimum duration of the inactive slots of the slotted transmission and/or may correspond to a maximum duration of the active slots.

Generally, such indication of the timing parameter may be explicit, e.g., include parameters of a Layer 3 control message. Alternatively or additionally, the indication could also be implicit, e.g., in terms of predefined categories of the UE capability.

According to various examples described herein, such slotted transmission can be combined with CE. This may in particular facilitate low-performance batteries for IoT solutions. Here, recovery durations for the battery, e.g., for re-charging a capacitor, can be implemented in accordance with the slotted transmission.

Various examples described herein are based on the finding that transmission of the control message which is indicative of the timing parameter of the slotted transmission may impose additional energy consumption due to additional control signaling overhead. For example, each initiation of transmission of data would require a corresponding initial startup procedure which leads to the additional energy consumption for transmission of the control message indicative of the timing parameter. Nonetheless, the overall energy consumption may be reduced: This may be due to reduced wearout of the battery in view of the tailored timing of the slotted transmission. Generally, a trade-off between increased battery lifetime and increased energy consumption may have to be resolved. This may result in the slotted transmission being selectively activated, e.g., depending on a type of the battery of the UE, depending on a service associated with data to be transmitted, network policies in terms of flexibility of scheduling, etc. Examples where the slotted transmission can be of particular benefit may include battery-powered sensors that only sporadically upload data with a long silence in between, e.g., on the order of weeks or months.

Although the invention has been shown and described with respect to certain preferred embodiments, equivalents and modifications will occur to others skilled in the art upon the reading and understanding of the specification. The present invention includes all such equivalents and modifications and is only limited by the scope of the appended claims.

For example, above various examples have been disclosed with respect to CE used for transmission of data. Here, multiple repetitions of the data encoded according to the same redundancy version is employed. However, the techniques of slotted transmission may also be employed for non-CE transmission scenarios, i.e., where it is not required to transmit multiple repetitions of the data encoded according to the same redundancy version.

Likewise, above, various examples have been described where a control message is transmitted from the UE to the BS. However, in other examples, it would also be possible that the UE receives the control message, e.g., from a relay. Then, the slotted transmission may be employed for facilitating UE-to-UE communication on a ceiling channel of the wireless link.

Furthermore, above, various examples have been described where the UE indicates the capability in terms of the timing parameter of the slotted transmission. However, in other examples, it would also be possible that the UE does not indicate a capability, but rather a definitive timing parameter to which the network has to adapt.

The invention claimed is:

1. A method, comprising:
configuring, at a wireless device, a timing parameter for an upcoming slotted transmission, the upcoming slotted transmission comprising a sequence of active slots that are each followed by a corresponding inactive slot, the configuring of the timing parameter including configuring the timing parameter to indicate to the network node a minimum duration of the inactive slots, the minimum duration configured to allow a battery of the wireless device to recover the battery's power delivery capacity to a wireless interface of the wireless device before a next one of the active slots begins;
transmitting, from the wireless device to a network node of a network and on a wireless link of the network, a control message comprising the timing parameter for the upcoming slotted transmission;
receiving, in response to the control message by the wireless device and from the network node, a resource allocation that defines, to the wireless device, wireless resources on the wireless link corresponding to the sequence of the active slots and the inactive slots; and
transmitting, with the wireless interface of the wireless device to the network, data in the wireless resources corresponding to two or more successive active slots on the wireless link, and not transmitting data during any of the inactive slots.

2. The method of claim 1,
wherein the minimum duration of the inactive slots is 50 ms.

3. The method of claim 1,
wherein the timing parameter corresponds to at least one of the following:
a maximum duty cycle of a duration of the active slots with respect to a duration of the inactive slots; or
a maximum duration of the active slots.

4. The method of claim 1,
wherein the timing parameter depends on at least one of
a modulation scheme used for transmitting the data and
a transmit power used for transmitting the data.

5. The method of claim 1, further comprising:
determining the timing parameter based on at least one of
a modulation scheme used for transmitting the data and
a transmit power used for transmitting the data.

6. The method of claim 1, further comprising:
monitoring at least one of a state of charge and a state of health of the battery powering the wireless interface for transmitting the data on the wireless link, and
determining the timing parameter based on said monitoring of the at least one of the state of charge and the state of health.

7. The method of claim 1, further comprising:
during the active slots: monitoring an energy drain from the battery powering the wireless interface for transmitting the data on the wireless link, and
determining the timing parameter based on said monitoring of the energy drain.

8. The method of claim 1, wherein the data is repeatedly transmitted in a series of coverage enhancement repetitions, and at least two repetitions of the data is transmitted in each active slot.

9. The method of claim 1, wherein the inactive slots have reduced power consumption at an interface for transmitting the data on the wireless link compared to active slots in which data is transmitted.

10. The method of claim 8,
wherein at least some of the active slots of the plurality of active slots comprise a transmit section and a receive section, the repetition of data being transmitted during the transmit section,
wherein the method further comprises:
receiving, in the receive section of the at least some of the active slots, at least one repetition of downlink data.

11. The method of claim 1,
wherein the at least one control message is further indicative of a further timing parameter of a slotted reception comprising a plurality of further active slots and a plurality of further inactive slots.

12. The method of claim 11,
wherein at least some of the inactive slots of the plurality of inactive slots of the slotted transmission and at least some of the further inactive slots of the plurality of further inactive slots of the slotted reception are at least partially overlapping in time domain.

13. The method of claim 1, further comprising:
selectively activating the slotted transmission based on a service associated with the data.

14. The method of claim 1,
in response to transmitting the at least one control message: receiving, on the wireless link, a scheduling control message indicative of one or more resources on the wireless link, the active slots comprising the resources,
wherein the data is transmitted using the resources.

15. A wireless device comprising:
a battery;
a wireless interface; and
control circuitry, the control circuitry configured to:
configure a timing parameter for an upcoming slotted transmission, the upcoming slotted transmission comprising a sequence of active slots that are each followed by a corresponding inactive slot, the configuring of the timing parameter including configuring the timing parameter to indicate to the network node a minimum duration of the inactive slots, the minimum duration configured to allow a battery of the wireless device to recover the battery's power delivery capacity to the wireless interface of the wireless device before a next one of the active slots begins;
transmit, from the wireless device to a network node of a network and on a wireless link of the network, a control message comprising the timing parameter for the upcoming slotted transmission;
receive, in response to the control message by the wireless device and from the network node, a resource allocation that defines, to the wireless device, wireless resources on the wireless link corresponding to the sequence of the active slots and the inactive slots; and transmit, with the wireless interface of the wireless device to the network, data in the wireless resources corresponding to two or more successive active slots on the wireless link, and not transmitting data during any of the inactive slots.

16. The method of claim 8, wherein each repetition of the data is encoded according to the same redundancy version.

17. The method of claim 1, wherein each active slot and each inactive slot are comprised in a fixed time-frequency resource grid.

18. The method of claim 1, wherein the power delivery capacity of the battery of the wireless device is specified as an output current characteristic of the battery during active data transmission.

* * * * *